United States Patent [19]

Poiesz et al.

[11] Patent Number: 5,105,763
[45] Date of Patent: Apr. 21, 1992

[54] METHOD OF MAKING ANIMALS IDENTIFIABLE BY MEANS OF A MINIATURE RESPONDER, AND APPARATUS FOR IDENTIFYING ANIMALS THUS MADE IDENTIFIABLE

[75] Inventors: Gerardus W. Poiesz, Warnsveld; Hans Eil, Hengelo; Hendrik J. de Jong, Groenlo, all of Netherlands

[73] Assignee: N.V. Nederlandsche Apparatenfabriek NEDAP, De Groenlo, Netherlands

[21] Appl. No.: 657,048

[22] Filed: Feb. 15, 1991

[30] Foreign Application Priority Data

Feb. 15, 1990 [NL] Netherlands ............ 9000357
Apr. 24, 1990 [NL] Netherlands ............ 9000974

[51] Int. Cl.⁵ ................ A01K 1/10; A61B 17/00
[52] U.S. Cl. ................ 119/51.02; 606/116; 40/300
[58] Field of Search ........ 119/51.02, 155; 40/300; 606/116, 117; 340/825.54

[56] References Cited

U.S. PATENT DOCUMENTS

| | | | |
|---|---|---|---|
| 3,128,744 | 4/1964 | Jefferts et al. | 119/3 |
| 3,820,545 | 6/1974 | Jefferts | 128/330 |
| 4,065,753 | 12/1977 | Paul, Jr. | 606/116 X |
| 4,129,855 | 12/1978 | Rodrian | 119/51.02 X |
| 4,171,684 | 10/1979 | Herr et al. | 119/27 |
| 4,252,110 | 2/1981 | Behney | 606/117 X |
| 4,750,490 | 6/1988 | Haw et al. | 40/300 |
| 4,909,250 | 3/1990 | Smith | 606/117 |
| 5,002,548 | 3/1991 | Campbell et al. | 606/116 |

FOREIGN PATENT DOCUMENTS

| | | |
|---|---|---|
| 0331269 | 3/1989 | European Pat. Off. |
| 7606727 | 12/1977 | Netherlands |
| 176404 | 10/1985 | Netherlands |
| 8701027 | 11/1988 | Netherlands |

Primary Examiner—Gene Mancene
Assistant Examiner—Thomas Price
Attorney, Agent, or Firm—Fleit, Jacobson, Cohn, Price, Holman & Stern

[57] ABSTRACT

A method of identifying an animal from a distance by a miniature responder includes implanting a responder (1) in the form of an injectable capsule, subcutaneously and laterally of the front part of the head of the animal between an eye (3) and the sensitive (mostly bald) nose tip (4), at the side (5) of the upper jaw (6). An apparatus for feeding, baiting and/or watering animals having a miniature responder implanted therein according to this method includes a detection coil (12) disposed in close proximity to a feeding, baiting, or watering device (11) so as to be poorly accessible to the animal, the device having a shape and/or position for guiding the animal's nose in use to the device (11) in a natural manner so that the miniature responder is well-oriented and well-centered relative to the detection coil (12).

20 Claims, 3 Drawing Sheets

METHOD OF MAKING ANIMALS IDENTIFIABLE BY MEANS OF A MINIATURE RESPONDER, AND APPARATUS FOR IDENTIFYING ANIMALS THUS MADE IDENTIFIABLE

BACKGROUND OF THE INVENTION

This invention relates to a method of making animals identifiable by means of a miniature responder.

In the present state of the art in making integrated electronic circuits on a chip, it is possible to make a very small responder for automatic radio-frequency animal recognition, for example, in the form of a small tubular capsule. One example of a circuit for such a responder is described in applicant's Netherlands patent No. 176404, corresponding to U.S. Pat. No. 4,196,418.

Such responders may comprise a number which is unique for each animal (the "life number") which can be read by a special transmitter/receiver to suit requirements. After being provided with such a responder, each animal is individually identifiable, which provides great advantages for example in controlling diseases, breeding programs, guaranteed quality meat, etc.

It is of importance that the responders should not be lost or become damaged. Consequently, the place where the responder is located is of great importance. This also applies if the responder takes the form of a so-called injectate.

A responder in the form of an injectate must be permitted to be applied in a simple manner, even by (instructed) lay people, must not be lost during the entire lifetime of the animal, and must continue to operate properly. A particular requirement of injectates is that they must be recoverable in a fast and reliable manner when the animal is slaughtered to prevent it from remaining behind in meat for consumption.

In view of the above, it is difficult to find a good place for implanting a responder, and in particular a good injection site, especially in the case of larger animals such as cows, but also in pigs. An injectate is implanted shortly after birth, i.e., when the animal is still small. During growth, which may take half a year to a number of years, the animal becomes very much larger, and this growth naturally also takes place around the responder, as a result of which its location is changed. Quite often, an injectate comes to be located more deeply during growth, and accordingly becomes more difficult to find during the slaughtering process. Many injection sites have been examined, such as:

| | in the ear: |
|---|---|
| advantages: | *relatively slight tissue growth<br>*no loss of valuable meat |
| disadvantages: | *injectate may easily become lost, especially in the first time after injection<br>*injectate may be damaged by the animal's striking its ears against hard objects |
| | just behind the ear: |
| advantages: | *injection site well defined |
| disadvantages: | *profuse tissue growth; location during slaughter problematic, and hence loss of time |
| | in leg at hoof: |
| advantages: | *relatively slight tissue growth, no loss of valuable meat |
| disadvantages: | *injectate may easily be damaged<br>*difficult to detect automatically |
| | at anus or tailroot: |
| advantages: | *no loss of valuable meat |
| disadvantages: | *profuse tissue growth, difficult to find during slaughter<br>*difficult to detect automatically. |

Thus all of the sites hitherto examined have specific disadvantages, especially in the case of the larger domestic animals, such as cows, but also in pigs. In addition, the preferred methods of injection in these animals is subcutaneous, because that is where muscular tissue is formed least, and hence the location of the injectate during growth is best preserved. But, especially in cows, after slaughter, the entire skin is removed as much as possible as one whole (for the leather industry).

It will be clear that during this skinning process, the injectate will either stick to the skin or remain behind in the body, or even drop away.

BRIEF SUMMARY OF THE INVENTION

According to the present invention, the above-described requirements are satisfied, and the above problems solved by implanting the responder in a non-obvious place, namely, laterally of the front part of the head between the eyes and the sensitive (mostly bald) part of the muzzle, at the upper jaw side. A good place in cows for example, according to the present invention is the foremost 5 cm from the nose tip in the attachment of the upper lip, left or right of the median plane of the nose. In medical terms, this is the lateral nose region (*regio lateralis nasi*) or the upper jaw region (*regio maxillaris*), just behind the nostril region (*regio naris*). Preferably, the responder is implanted by means of injection. This can only be done with the modern miniaturized injectates of, for example a diameter of 2.8 mm and 19 mm long, because they should already be injected in the new-born calf. Pigs are commonly injected several weeks later, but even then the animal is still very small. Naturally, the head, and hence the nose part will grow in the years thereafter, but there is little growth of muscle and fat in the nose part, so that the location of the injectate is very well preserved. It is true that the animal may injure itself at this location, but in practice it is found that the tissue distributes the impact in such a manner that the injectate is not damaged. The excellent location of the injectate makes radiographic detection easy, and especially automatic feeding is very feasible in this manner. In fact, during eating, the place of the animal's nose is accurately known, so that a relatively small antenna coil can be provided for detection at that location. This means that a large detection distance is unnecessary. A detection distance of, for example, 15 to 20 cm is sufficient for this purpose. Other injection sites require a larger detection range for automatic detection. Disadvantages of such a larger distance are that the injectate must be larger, owing to the necessary larger internal antenna coil, and that it is difficult to discriminate between two animals standing next to each other, because in that case the responders of the two animals may be so close together as to be within the same detection field. It is then uncertain to which animal the detecter responder code belongs. When the injection site according to the present invention has been used, discrimination, for example, via the manger, is absolutely certain, and a small injectate with the consequential smaller detection range can be used without any objection. A further major advantage of the injection site according to the present invention is that the injectate may be recovered after slaughter with rapidity and certainty. In cows, commonly just before they are skinned, an incision is made at about 5 cm from the nose tip at the top of the muzzle: the nose skin is stripped up to that incision, and the skin of the nose tip (with the subjacent injectate) is left in position on the head and can be recovered, or destroyed with the total head. The very small amount of meat of the nose skin is not normally consumed, so that there is no loss for the farmer and the abattoir. In a modern slaughtering method for pigs, the head is removed in its entirety and subsequently stripped of the meat by mechanical means. Before the removal of the meat, however, a portion of the nose tip is cut off. In this part, the miniaturized injectate may be implanted, so that it may be easily and rapidly recovered or destroyed.

BRIEF DESCRIPTION OF THE DRAWINGS

One embodiment of the invention will now be described in more detail, by way of example, with reference to the accompanying diagrammatic drawings, wherein.

DETAILED DESCRIPTION

Figure 1:
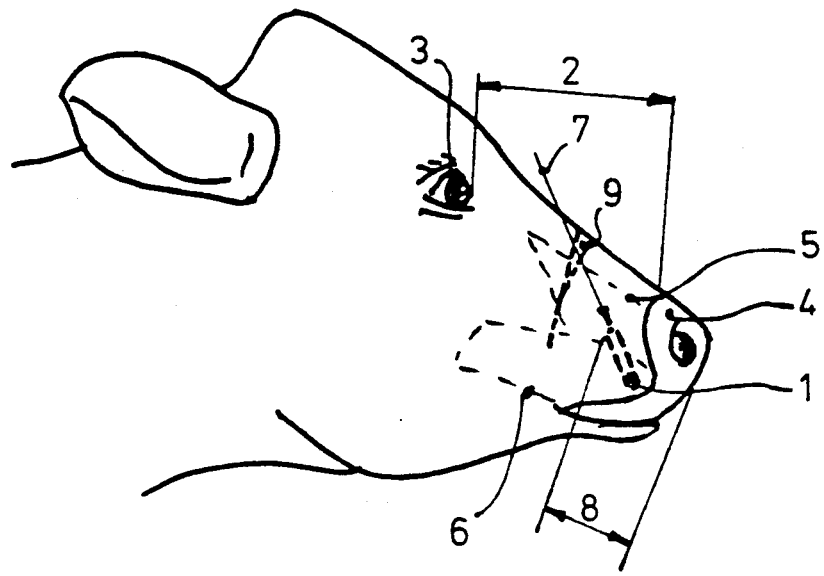
FIG. 1 shows the head of a cow provided with a miniature responder implanted in accordance with the present invention.

The accompanying drawings show animal heads provided with a miniature responder in the form of an injectate 1. In accordance with this invention, the injectate is implanted in the nose part 2, located between the eye 3 and the sensitive, mostly bald, nostril region 4 on the side of the head at the upper jaw side. Preferred regions are the so-called lateral nose region 5 (*regio lateralis nasi*) and the upper jaw region 6 (*regio maxillaris*). Injection is effected subcutaneously adjacent to the attachment of the upper lip. The direction of injection 7 may vary from parallel with, to perpendicular to the line connecting the eye with the nostril, according to the animal species and the desired disposition of the antenna of the transmitter/receiver. The distance 8 from the distal end of the injectate 1 to the nose tip depends partly on the slaughtering method and should mostly be preferably no more than 5 cm. At this distance, for example in cows (FIG. 1), before skinning an incision 9 may be made, so that from that place the skin of the nose tip, and hence, the injectate, remains in place. The head is discharged for destruction, whereby at the same time (as desired) the injectate is removed from circulation. Alternatively, if desired, the injectate may be simply and quickly removed after slaughter, by virtue of its accurately known location.

Figure 2:
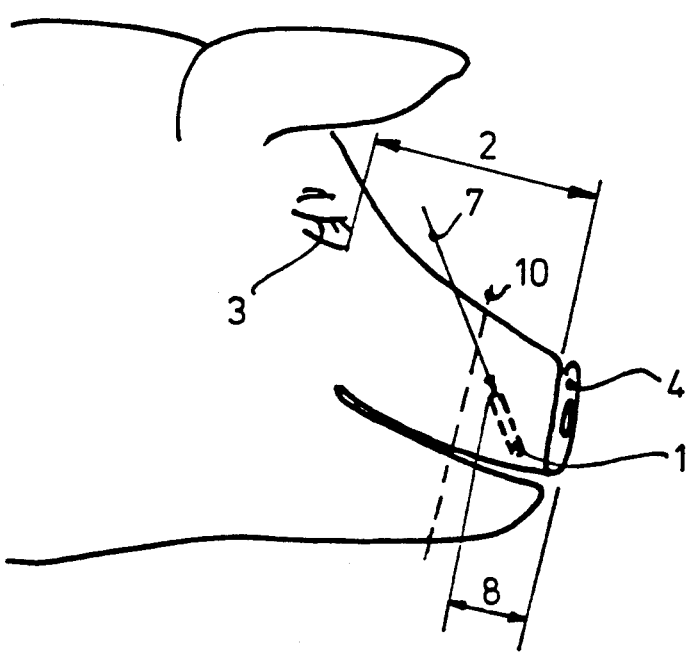
FIG. 2 shows the head of a pig provided with a miniature responder implanted in accordance with the present invention.

A similar line of reasoning applies to pigs (FIG. 2). In the case of pigs, in some abattoirs, the entire nose tip is cut or sawed off at 10 before the head is stripped of meat. The cut-off nose tip is removed for destruction, so that here again the injectate is destroyed or can be recovered.

Figure 3:
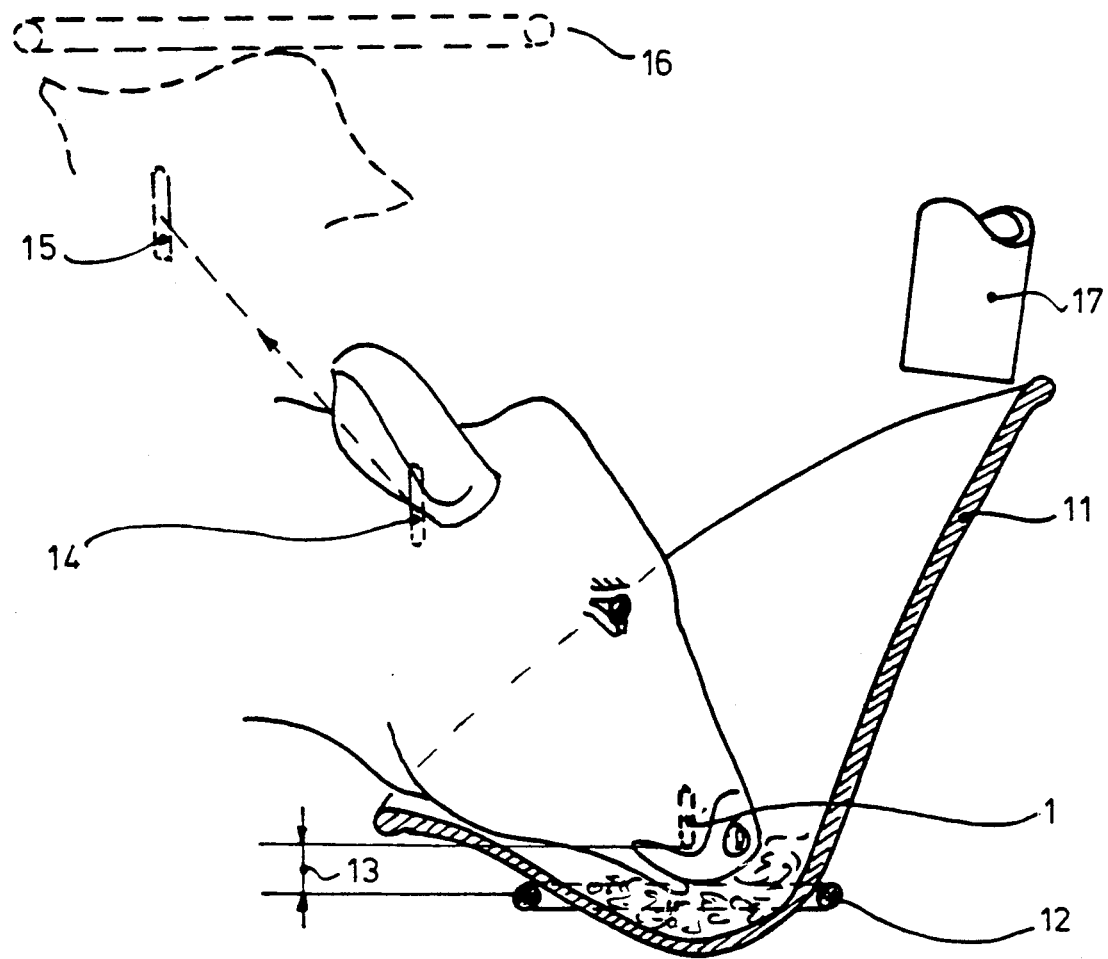
FIG. 3 shows a head of an animal provided with a miniature responder in accordance with the present invention in relation to a manger or drinking vessel.

FIG. 3 shows a somewhat funnel-shaped feeding or drinking trough 11, especially designed in association with the method according to this invention. The trough is of simple conical shape and forces an animal to hold its head during eating in a natural manner at such a position that the tip of the nose is within a well-defined range within the magnetic field of a detection coil 12 provided on the outside around the trough. The trough 11 is preferably made of a non-conducting material, for example, a wear-resistant plastics, thereby permitting the field lines to pass without hindrance. The injectate 1 is oriented in a direction relative to coil 12 which is optimal for detection, and the distance 13 is relatively small and hardly dependent upon the growth phase (and hence of the dimensions) of the animal. Consequently, there is an excellent magnetic coupling of injectate to antenna coil. As a result, not only is detection ensured, even with the present miniaturized injectate, but also, by virtue of the small size of the coil and the relatively weak interrogation field that is required, the spread of the magnetic force lines outside the coil will be slight. The advantage is that a second detection coil, for example, of an adjacent feeding trough, can be disposed in the near vicinity, without being adversely affected by the first. The fact is that undue interaction will cause one coil to interfere with the other, thereby precluding reliable detection. Moreover, an animal in the vicinity of the trough, but not eating, might erroneously be detected. If the injectate were implanted at a different location, for example at a conventional site behind the ear, its spatial position would be greatly dependent upon the animal's growth phase. A head may easily become more than twice as large, so that the injectate may move from position 14 to position 15 (see FIG. 2) relative to the feeding trough. A detection coil 16 will have to be larger than that shown at 12, and the distance of the injectate at position 14 from coil 16 is initially long, which results in poor detectability. Coil 16 must have a large area, because the horizontal component of the displacement of the injectate is also large. The disadvantages of coil position 16 relative to position 12 will be clear:

constructionally, position 16 is difficult to protect; the animal may bump against it (the horns are not always removed). Position 12, on the other hand, cannot be reached by the animal and is well protected.

suspending an antenna at position 16 is difficult in most feeding trough constructions a dark hole is apt to form below coil 16, which may startle animals.

the large coil size and the required stronger detection field in connection with the large distance of the injectate cause an extensive interference field, as a result of which the mangers must often be placed uneconomically far apart to prevent interaction an animal in the vicinity may erroneously be identified.

The filling of the feeding trough with a ration, which may be determined by means of a computer for each individual animal, is effected in a conventional manner, for example, through a chute 17.

In the milking stand, too, a feeding trough according to this invention can be used for the reliable identification of animals to be milked. If fodder is not normally supplied at the milking stand, some bait may be supplied or, instead of food, for example, a salt lick may be provided, which, again, is provided with an antenna of a transmitter/receiver.

Figure 4:
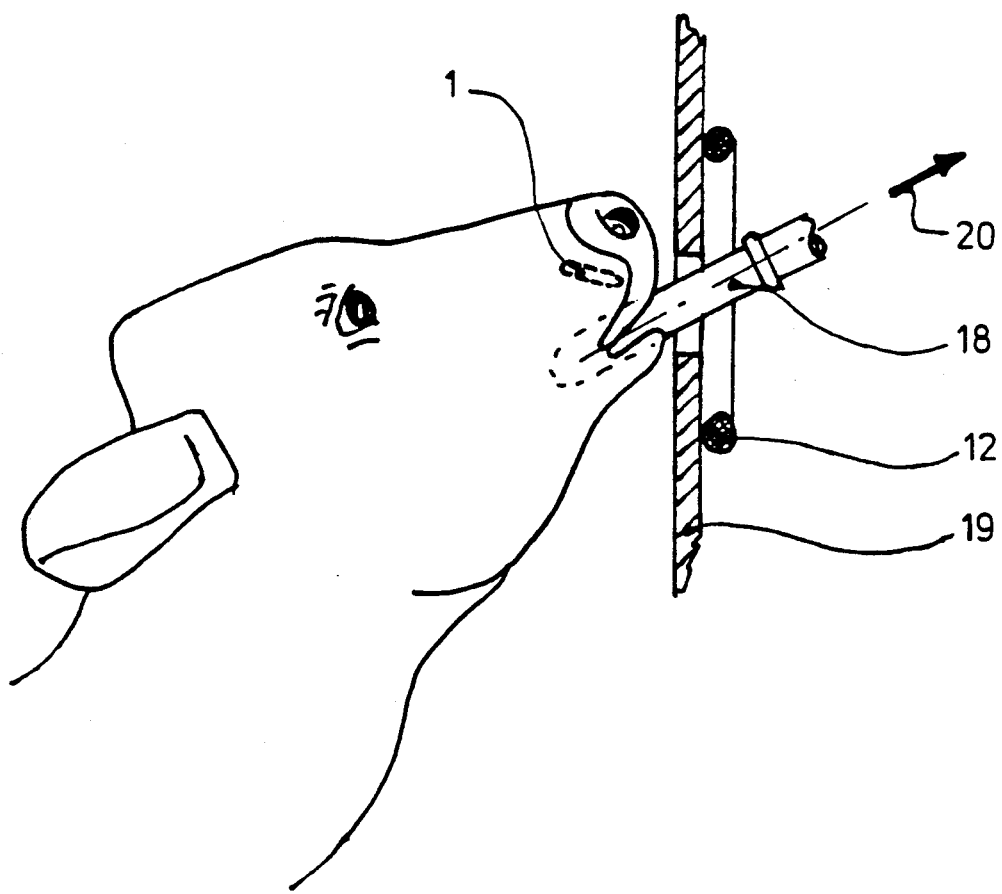
FIG. 4 shows the head of a calf provided with a miniature responder in accordance with the present invention, in relation to a teat of a feeding device.

FIG. 4 illustrates yet another example of a detection device associated with the method of injection according to this invention. This concerns application with a drinking nipple or teat (18). Here again, the required detection coil 12 may be small, and disposed so as to be inaccessible to the animal. By nature, the position of injectate 1 is excellently fixed relative to coil 12. Such a drinking station, but then without coil 12, is already described in applicant's patent application NL-A-8400191. Its special feature is that the nipple or teat 18 can be made inaccessible to the animal when the portion provided has been drunk. This can be achieved by withdrawing nipple or teat 18 in the direction 20, or by moving a partition 19 in the direction of the animal, with the nipple or teat remaining behind. Naturally, in cases where the animals are allowed to drink ad libitum, means for making nipple or teat 18 inaccessible would be unnecessary. Shutting off the stream of food or water can then be done, for example, with a normal valve.

In the examples of FIGS. 3 and 4, cows are shown. Naturally, other animals, such as pigs, may be provided with food and/or drinking water in this manner, provided they have an injectate at the same location.

We claim:

1. A method of identifying an animal from a distance by a responder, comprising:
   implanting a miniature responder in the animal's head laterally of the central front part of the head between one of the eyes and the sensitive (mostly bald) tip of the nose, at the side of the upper jaw on the same side as said one eye.

2. A method as claimed in claim 1, wherein:
   said miniature responder comprises an injectable capsule; and
   said implanting step comprises injecting said capsule subcutaneously.

3. A method as claimed in claim 1 wherein said implanting comprises:
   implanting said miniature responder in the head of a cow between the nose tip and the position where an incision is made in a slaughtering process for cows to prevent the nose tip from being skinned during the slaughtering process.

4. A method as claimed in claim 1 wherein said implanting comprises:
   implanting said miniature responder in the head of a pig between the nose tip and the position where the nose of a pig as cut through during a slaughtering process.

5. A method as claimed in claim 1, wherein said implanting comprises:
   implanting said miniature responder on one of the left and right sides of the nose, where the upper lip is attached.

6. A method as claimed in claim 1, wherein said implanting comprises:
   implanting said miniature responder in one of the lateral nose region (*regio lateralis nasi*) and the upper jaw region (*regio maxillaris*) just behind the nostril region (*regio naris*).

7. A method as claimed in claim 6, wherein:
   said miniature responder is an elongate capsule; and
   said implanting comprises implanting said capsule at a point on a line connecting said one eye with the nostril at substantially 2 cm from the nostril by inserting said capsule at an angle of introduction relative to said line in the range between 30° and 60°, with the longitudinal axial direction of said capsule coinciding with said angle of introduction, so that said capsule after implantation has a shortest distance from said line of 1 to 2 cm.

8. A method as claimed in claim 6, wherein said implanting comprises:
   injecting said responder from a position adjacent the lip of the animal.

9. A method for identifying an animal during feeding, baiting and/or watering thereof comprising:
   implanting a miniature responder in the head of the animal laterally of the central part of the head between one of the eyes and the sensitive (mostly bald) tip of the nose at the side of the upper jaw on the same side as said one eye;
   providing a device for facilitating at least one of feeding, baiting and watering the animal;
   positioning said device so that the animal's nose is guided to said device in a natural manner for use;
   providing a detection coil disposed adjacent to said device in a position inaccessible to the animal and in proximity to said implanted responder so that the responder is oriented and centered relative to said detection coil when in use.

10. A method for feeding animals as claimed in claim 9, wherein:
    said device is provided as a funnel-shaped trough made of an electrically insulating material and having a substantially conical shape opening upwardly;
    positioning said detection coil substantially horizontally around said trough adjacent to the deepest part at the lower end thereof away from the animal; and
    providing said detection coil sufficiently small in size so that animals having a responder implanted therein and present in the vicinity of, but not using, said device, are not detected.

11. A method for baiting animals as claimed in claim 23 comprising:
    providing said device as a salt lick; and
    positioning said detection coil behind said salt lick.

12. A method as claimed in claim 11, wherein:
    said detection coil is invisible to the animal.

13. A method for watering and feeding animals with liquid food as claimed in claim 9, comprising:
    providing said device as a nipple disposed substantially in the center of said detection coil.

14. A method as claimed in claim 13 and further comprising:
    providing a partition of electrically insulating material between the animal and said detection coil; and
    providing a hole in said partition adjacent a central portion of said detection coil so that said nipple extends through said hole.

15. Apparatus for identifying an animal during feeding, baiting and/or watering thereof comprising:
    a miniature responder implanted in the head of the animal in a position laterally of the central front part of the head between one of the eyes and the sensitive (most bald) tip of the nose at the side of the upper jaw on the same side as said one eye;
    a device for facilitating at least one of feeding, baiting and watering the animal so that the nose of the animal is guided to said device in a natural manner in use; and
    a detection coil disposed in proximity to said device in a position inaccessible to the animal, and in proximity to said implanted responder when the animal is using said device so that said responder is oriented and substantially centered relative to said detection coil for detecting said responder.

16. Apparatus for feeding animals as claimed in claim 15, wherein:
said device comprises a funnel-shaped trough made of an electrically insulating material and having a substantially conical shape opening upwardly;
said detection coil is substantially horizontally positioned around said trough adjacent to the deepest part at the lower end thereof away from the animal; and
said detection coil is sufficiently small in size so that animals having a responder implanted therein and present in the vicinity of but not using said device are not detected.

17. Apparatus for baiting animals as claimed in claim 15 wherein:
said device comprises a salt lick; and
said detection coil is positioned behind said salt lick.

18. Apparatus as claimed in claim 17, wherein:
said detection coil is invisible to the animal.

19. Apparatus for watering and feeding animals with liquid food as claimed in claim 15, wherein:
said device comprises a nipple disposed substantially in the center of said detection coil.

20. Apparatus as claimed in claim 19, and further comprising:
a partition of electrically insulating material between the animal and said detection coil; and
a hole in said partition adjacent a central portion of said detection coil, said nipple extending through said hole.

* * * * *